United States Patent
Tseng et al.

(10) Patent No.: US 12,282,630 B2
(45) Date of Patent: Apr. 22, 2025

(54) TOUCH DISPLAY DEVICE AND OPERATION METHOD THEREOF

(71) Applicant: E Ink Holdings Inc., Hsinchu (TW)

(72) Inventors: Hung Wei Tseng, Hsinchu (TW); Yi Chun Kuo, Hsinchu (TW); Chen Cheng Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/391,667

(22) Filed: Dec. 21, 2023

(65) Prior Publication Data

US 2024/0264701 A1 Aug. 8, 2024

(30) Foreign Application Priority Data

Feb. 6, 2023 (TW) .................. 112104095

(51) Int. Cl.
*G06F 3/041* (2006.01)

(52) U.S. Cl.
CPC ........ *G06F 3/04184* (2019.05); *G06F 3/0412* (2013.01)

(58) Field of Classification Search
CPC . G06F 3/04166; G06F 3/0412; G06F 3/04184
See application file for complete search history.

(56) References Cited

U.S. PATENT DOCUMENTS

| | | | |
|---|---|---|---|
| 8,274,481 B2 | 9/2012 | Nishimura et al. | |
| 8,711,117 B2 | 4/2014 | Lee et al. | |
| 9,619,083 B1* | 4/2017 | Kang | .................... G06F 3/0412 |
| 10,474,281 B2 | 11/2019 | Park et al. | |
| 10,739,917 B2 | 8/2020 | Kurasawa et al. | |
| 2016/0062546 A1 | 3/2016 | Ningrat et al. | |
| 2016/0124881 A1 | 5/2016 | Zhang et al. | |
| 2019/0317630 A1 | 10/2019 | Shaw | |
| 2022/0075475 A1 | 3/2022 | Jeon | |

FOREIGN PATENT DOCUMENTS

| | | |
|---|---|---|
| TW | 202032344 | 9/2020 |
| TW | 202107257 | 2/2021 |

* cited by examiner

*Primary Examiner* — Abbas I Abdulselam
(74) *Attorney, Agent, or Firm* — JCIPRNET

(57) ABSTRACT

The invention provides a touch display device and an operation method for the touch display device. The touch display device includes an integrated control circuit and a touch driver. The integrated control circuit is coupled to the touch driver. The integrated control circuit outputs a first synchronization signal to the touch driver. The touch driver outputs a touch mode signal to the integrated control circuit, so that the integrated control circuit generates a synchronization enabling signal to the touch driver according to the touch mode signal.

18 Claims, 6 Drawing Sheets

TOUCH DISPLAY DEVICE AND OPERATION METHOD THEREOF

CROSS-REFERENCE TO RELATED APPLICATION

This application claims the priority benefit of Taiwan application serial no. 112104095, filed on Feb. 6, 2023. The entirety of the above-mentioned patent application is hereby incorporated by reference herein and made a part of this specification.

BACKGROUND

Technical Field

The disclosure relates to a touch display technology, and particularly relates to a touch display device which can reduce interferences and an operation method thereof.

Description of Related Art

The integration of touch panel and display panel into a touch display device is a common application at present. However, as the size of the device shrinks and the demand for thinning increases, the distance between the touch panel and the display panel becomes quite close. Therefore, the traditional touch display device may have serious electromagnetic interferences between the touch panel and the display panel, which leads to poor touch sensing results. In addition, the traditional touch display device may also have the problem that the touch sensing frequency is too low, which also leads to poor touch sensing results.

SUMMARY

In view of this, the disclosure provides a touch display device and an operation method thereof, which can realize an effective touch sensing function.

The disclosure provides a touch display device, including an integrated control circuit and a touch driver. The touch driver is coupled to the integrated control circuit. The integrated control circuit outputs a first synchronization signal to the touch driver. The touch driver outputs a touch mode signal to the integrated control circuit, so that the integrated control circuit generates a synchronization enabling signal to the touch driver according to the touch mode signal.

The disclosure provides an operation method of a touch display device. The operation method includes the following. A first synchronization signal is output to a touch driver through an integrated control circuit. A touch mode signal is output to the integrated control circuit through the touch driver. A synchronization enabling signal is generated to the touch driver through the integrated control circuit according to the touch mode signal.

Based on the above, the touch display device and the operation method thereof provided by the disclosure can dynamically adjust the result of the touch driver driving the touch panel according to different touch modes, so as to effectively reduce electromagnetic interferences generated by the display driving of the display panel during the touch sensing process.

In order to make the above features and advantages of the disclosure more comprehensible, the following specific embodiments are described in detail together with the accompanying drawings.

DESCRIPTION OF THE EMBODIMENTS

Figure 1:
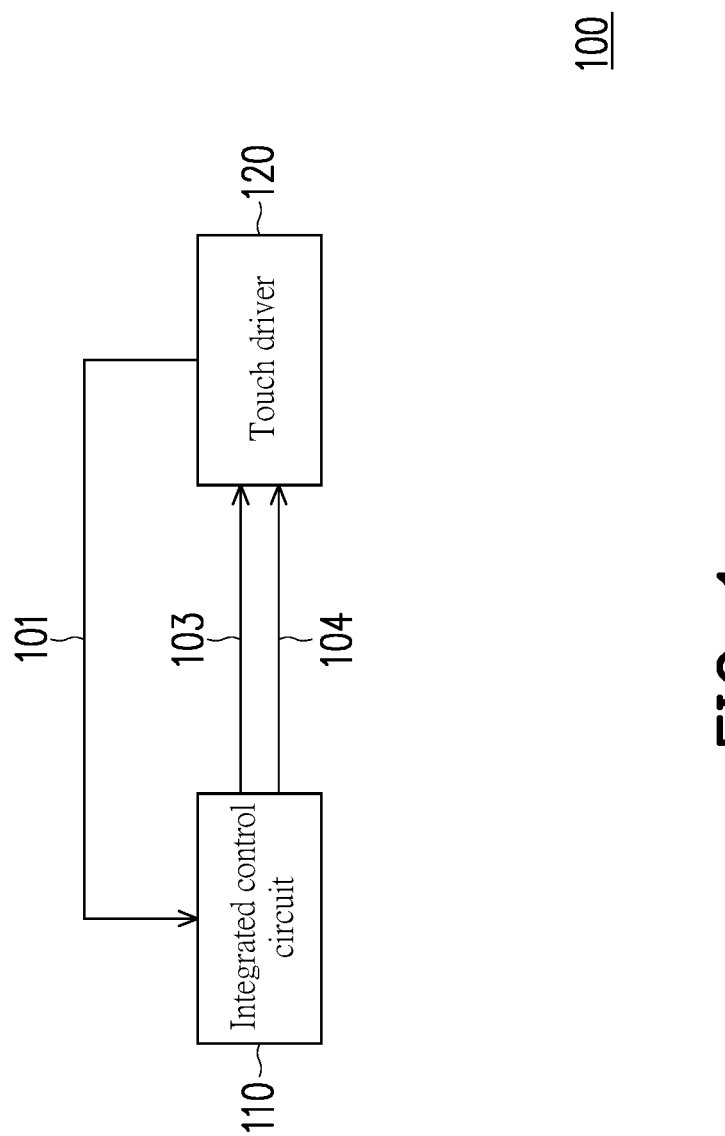
FIG. 1 is a schematic diagram of a touch display device according to an embodiment of the disclosure.

Some embodiments of the disclosure will be described in detail with reference to the accompanying drawings. For the reference numerals referenced in the following description, the same reference numerals are regarded as the same or similar components when appearing in different drawings. These embodiments are only a part of the disclosure and do not reveal all possible implementations of the disclosure. Rather, these embodiments are only examples within the scope of the disclosure.

FIG. 1 is a schematic diagram of a touch display device according to an embodiment of the disclosure. Referring to FIG. 1, a touch display device 100 includes an integrated control circuit 110 and a touch driver 120. The touch driver 120 is coupled to the integrated control circuit 110. In this embodiment, the integrated control circuit 110 may be used to drive a display panel, and the touch driver 120 may be used to drive a touch panel.

In this embodiment, the integrated control circuit 110 outputs a first synchronization signal 104 to the touch driver 120. The touch driver 120 may correspondingly output a touch mode signal 101 to the integrated control circuit 110 according to a current touch mode, so that the integrated control circuit 110 may output a synchronization enabling signal 103 to the touch driver 120 according to the touch mode signal 101. In this way, the touch driver 130 may control whether the touch panel follows the first synchronization signal 104 to perform touch sensing according to the synchronization enabling signal 103.

Figure 2:
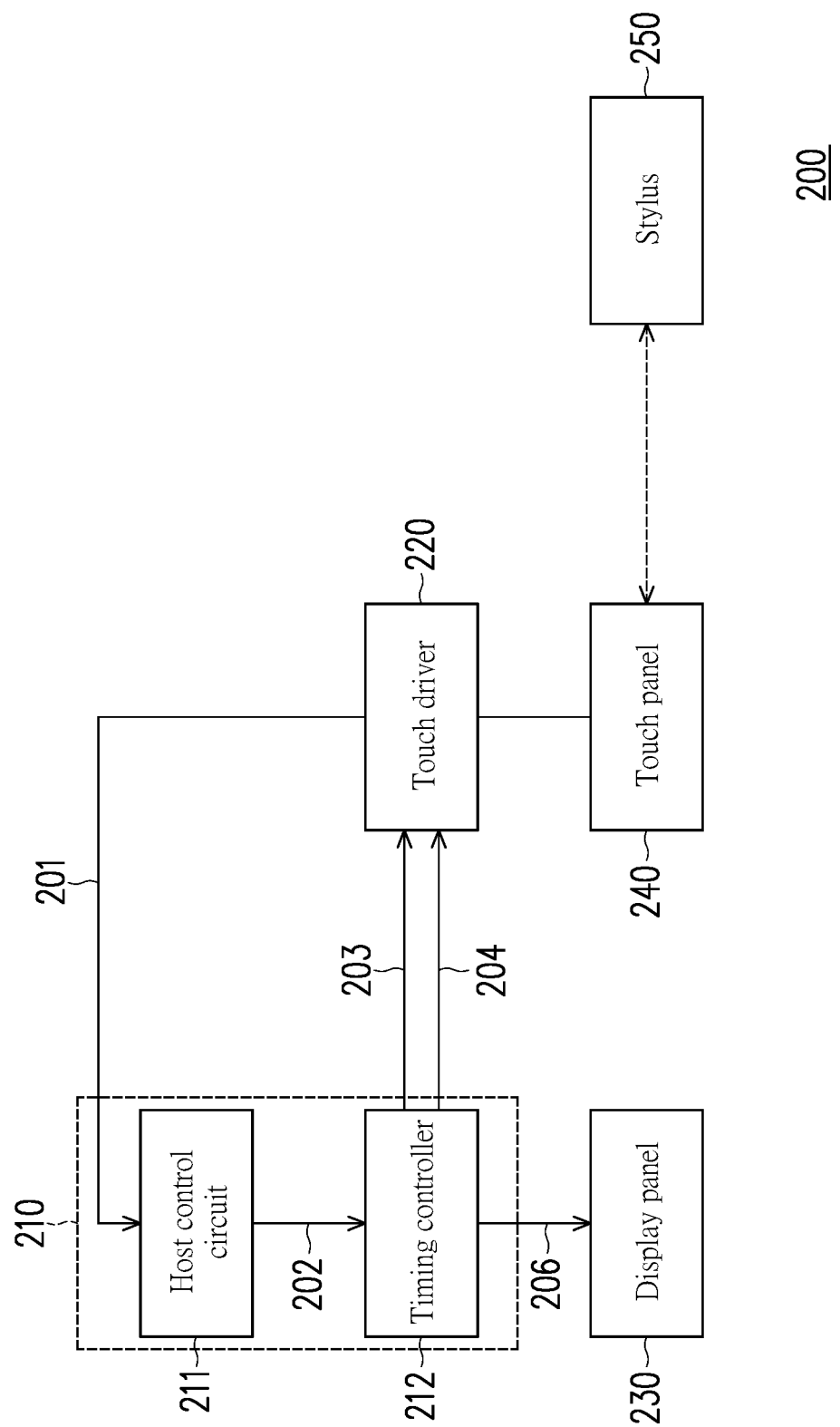
FIG. 2 is a schematic diagram of a touch display device according to another embodiment of the disclosure.

FIG. 2 is a schematic diagram of a touch display device according to another embodiment of the disclosure. Referring to FIG. 1, a touch display device 200 includes an integrated control circuit 210, a touch driver 220, a display panel 230, a touch panel 240 and a stylus 250. The integrated control circuit 210 includes a host control circuit 211 and a timing controller (TCON) 212. The host control circuit 211 is coupled to the TCON 212 and the touch driver 220. The TCON 212 is also coupled to the touch driver 220 and the display panel 230. The touch driver 220 is coupled to the touch panel 240. In this embodiment, the TCON 212 may be used to drive the display panel 230, and the touch driver 220 may be used to drive the touch panel 240. The touch panel 240 may be used to sense a touch operation result of the stylus 250 or fingers (not shown) of a user.

In this embodiment, the host control circuit 212 is, for example, a central processing unit (CPU), or other programmable general purpose or special purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar components or a combination of the above components.

In this embodiment, the display panel 230 may be, for example, an e-paper display panel (EPD panel), a liquid crystal display (LCD) panel, a light emitting diode display (LED display) panel or organic light emitting diode (OLED) display panel, etc., and the disclosure is not limited thereto. In this embodiment, the touch panel 240 may be integrated with the display panel 230, such as an in-cell touch or on-cell touch. The touch panel 240 may also be disposed directly above the display panel 230, and a projection of a touch sensing area of the touch panel 240 on the display panel 230 may at least partially overlap with a display area.

In this embodiment, the TCON 212 of the integrated control circuit 210 outputs a source output enabling signal 206 to the display panel 230, and the TCON 212 outputs the first synchronization signal 204 to the touch driver 220 according to the source output enabling signal 206. The first synchronization signal 204 is synchronized with the source output enabling signal 206. The source output enabling signal 206 is used to determine a display driving frequency of the display panel 230. In this embodiment, the touch driver 220 may output a touch mode signal 201 to the host control circuit 211 according to whether the stylus 250 or fingers of the user performs touch on the touch panel 240, so that the host control circuit 211 may generate a writing enabling signal 202 to the TCON 212 according to the touch mode signal 201. The writing enabling signal 202 may be used to determine whether the stylus 250 performs a writing operation or a general operation on the touch panel 240.

In this embodiment, the writing operation may, for example, refer to the user performing a writing action such as text or image on the touch panel 240 through the stylus 250. The general operation may, for example, mean that the user simply clicks or turns pages on the touch panel 240 through the stylus 250. In this embodiment, the writing enabling signal 202 is automatically detected for an operation mode of the touch panel and generated. In another embodiment, the writing enabling signal 202 may also be generated by the user operating physical keys or a human-machine interface of the touch display device 200 to perform a setting, but the disclosure is not limited thereto.

In this embodiment, the host control circuit 211 may output the writing enabling signal 202 to the TCON 212, so that the TCON 212 may further generate and output a synchronization enabling signal 203 to the touch driver 220 according to the writing enabling signal 202. However, in another embodiment, the synchronization enabling signal 203 may also be generated by the host control circuit 211 and output to the touch driver 220. In this way, the touch driver 220 may determine a driving result of the touch panel 240 according to the synchronization enabling signal 203 and the first synchronization signal 204. The touch driver 230 may control whether the touch panel 240 follows the first synchronization signal 204 to perform touch sensing according to the synchronization enabling signal 203. In this embodiment, the touch driver 220 may determine whether the touch panel 240 operates in a general touch operation, the writing operation of a stylus, or a general operation of a stylus according to the synchronization enabling signal 203 and the first synchronization signal 204, in which the general touch operation may refer to the user performs touch on the touch panel 240 through fingers. In this embodiment, the touch driver 220 may determine whether a sensing period of the touch panel 240 is synchronized with a screen idling period of the display panel 230 according to the synchronization enabling signal 203, that is, the sensing of the touch panel 240 is only performed during the screen idling period. The screen idling period may be, for example, a screen idling period when the display panel 230 updates a screen.

Figure 3:
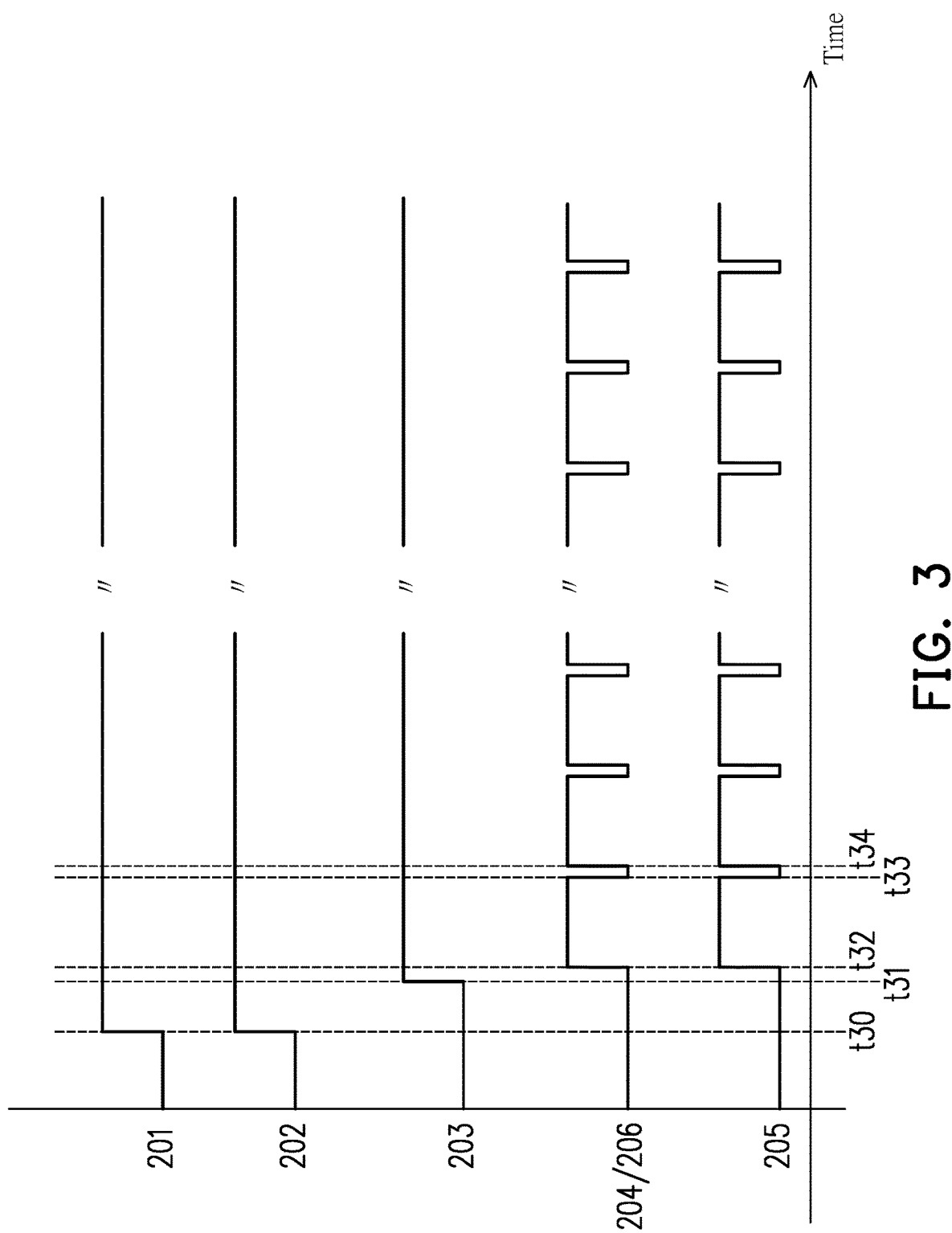
FIG. 3 is a timing diagram of a general touch operation according to an embodiment of the disclosure.

FIG. 3 is a timing diagram of the general touch operation according to an embodiment of the disclosure. Referring to FIG. 2 and FIG. 3, FIG. 3 takes the touch panel 240 operating in the general touch operation as an example. In this embodiment, the user may operate the touch panel 240 of the touch display device 200 to perform the general touch operation. At a time t30, when the touch driver 220 does not sense that the stylus 250 touches the touch panel 240 and determines that the user performs touch through fingers, the touch driver 220 outputs the touch mode signal 201 having a first voltage level to the host control circuit 211. The touch mode signal 201 may be switched between the first voltage level and a second voltage level, for example, in which the first voltage level may be, for example, a high voltage level, and the second voltage level may be, for example, a low voltage level, but the disclosure is not limited thereto. The host control circuit 211 may determine to output the writing enabling signal 202 having a third voltage level to the TCON 220 according to the touch mode signal 201. The writing enabling signal 202 may be switched between the third voltage level and a fourth voltage level, for example, in which the third voltage level may be, for example, the high voltage level, and the fourth voltage level may be, for example, the low voltage level, but the disclosure is not limited thereto.

At a time t31, the TCON 212 may output the synchronization enabling signal 203 having the first voltage level to the touch driver 220 according to the writing enabling signal 202. At a time t32, the TCON 212 may output the first synchronization signal 204 to the touch driver 220.

In this embodiment, the touch driver 220 may determine to follow the first synchronization signal 204 to perform touch sensing according to the synchronization enabling signal 203 having the first voltage level. At this time, the touch driver 220 determines that the sensing period of the touch panel 240 is synchronized with the screen idling period of the display panel 230. The touch driver 220 may operate the touch panel 250 according to an operation signal 205 (or referred to as an operation timing), in which the operation signal 205 is synchronized with the first synchronization signal 204. In this regard, the screen idling period is a period of a time t33 to t34 when both the first synchronization signal 204 and the operation signal 205 in FIG. 3 are at low voltage levels. The touch panel 240 performs touch sensing according to a touch frequency only during the screen idling period (the period of the time t33 to t34), and the touch panel 240 does not perform touch sensing during a screen non-idling period. In this regard, the screen non-idling period is a period of the time t32 to t33 when both the first synchronization signal 204 and the operation signal 205 in FIG. 3 are at high voltage levels.

Specifically, referring to the source output enabling signal 206, after the time t32, the source output enabling signal 206 has a waveform that changes periodically. For this, a period of the time t32 to the time t34 may be a period of the display panel 230 displaying a frame, and a waveform after the time t34 may be deduced by analogy. During a period of the time t32 to the time t33, the display panel 230 may drive a plurality of pixel units in the panel according to display data. A period of the time t33 to the time t34 may be the screen idling period, and the TCON 212 may not drive the pixel units in the display panel 230 during this period. Next, referring to the first synchronization signal 204, the first synchronization signal 204 may be synchronized with the source output enabling signal 206. The touch driver 220 may determine that the sensing period is a period of the time t33 to the time t34 according to the first synchronization signal 204, so that the sensing period of the touch panel 240 is synchronized with the screen idling period of the display panel 230. For example, the touch driver 220 may operate the touch panel 240 to perform sensing a touch result during the period of the time t33 to the time t34, and to periodically perform touch sensing after the time t34. Therefore, the touch sensing result obtained by the touch driver 220 by the user performing touch through fingers is not subject to electromagnetic interferences generated by the display driving of the display panel 230, and a correct touch sensing result may be provided.

Figure 4:
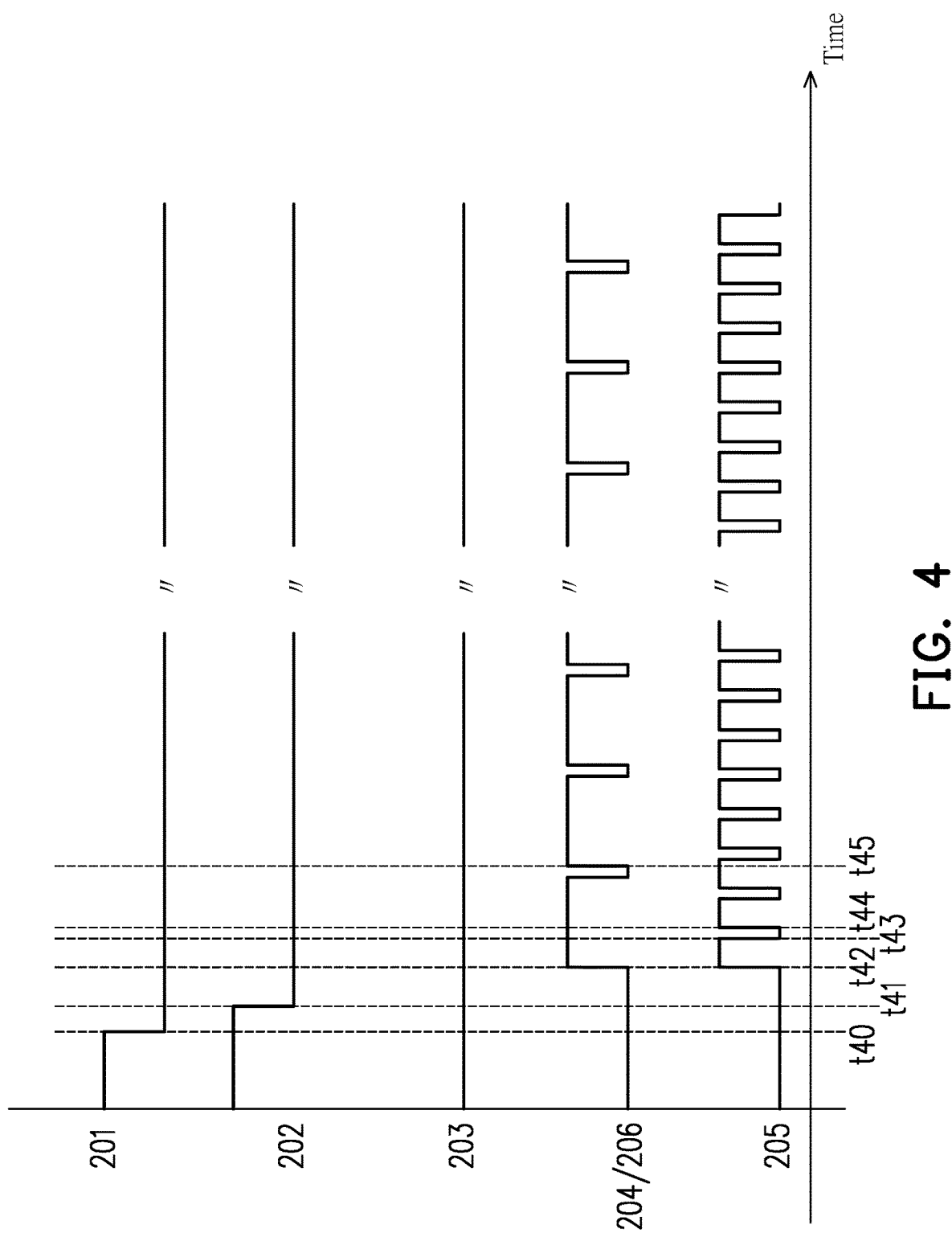
FIG. 4 is a timing diagram of a writing operation of a stylus according to an embodiment of the disclosure.

FIG. 4 is a timing diagram of the writing operation of a stylus according to an embodiment of the disclosure. Referring to FIG. 2 and FIG. 4, FIG. 4 takes the writing operation of the touch panel 240 operating on the stylus 250 as an example. In this embodiment, the user may use the stylus 250 to perform the writing operation on the touch panel 240 of the touch display device 200. At a time t40, when the touch driver 220 senses that the stylus 250 touches the touch panel 240 to perform touch, the touch driver 220 outputs the touch mode signal 201 having the second voltage level (such as the low voltage level) to the host control circuit 211. At a time t41, the host control circuit 211 may determine to output the writing enabling signal 202 having the fourth voltage level (such as the low voltage level) to the TCON 212 according to the touch mode signal 201, so that the TCON 212 may output the synchronization enabling signal 203 having the first voltage level (such as the low voltage level) to the touch driver 220 according to the writing enabling signal 202.

At a time t42, the TCON 220 may output the first synchronization signal 204 to the touch driver 220. In this embodiment, the touch driver 220 may determine whether the touch panel 240 follows the first synchronization signal 204 to perform touch sensing according to the synchronization enabling signal 203.

In this embodiment, the touch driver 220 may determine not to follow a signal frequency of the first synchronization signal 204 (that is, not to follow the source output enabling signal 205) to perform touch sensing according to the synchronization enabling signal 203 having the second voltage level. The touch driver 220 may operate the touch panel 250 according to the operation signal 205, in which the operation signal 205 is not synchronized with the first synchronization signal 204. In other words, when the TCON 212 determines that the writing enabling signal 202 is at the second voltage level, the sensing period of the touch panel 240 is not synchronized with the screen idling period of the display panel 230.

Specifically, referring to the source output enabling signal 206, after the time t42, the source output enabling signal 206 has the waveform that changes periodically, and the TCON 212 may output a first synchronization signal 204 synchronized with the source output enabling signal 206 to the touch driver 220. However, the touch driver 220 may generate the operation signal 205 having a signal frequency higher than the first synchronization signal 204 (also higher than the source output enabling signal 206). The touch driver 220 may operate the touch panel 250 according to the operation signal 205. For this, a period of the time t42 to a time t45 may be a period of the display panel 230 displaying a frame, and a waveform after the time t45 may be deduced by analogy. Next, referring to the operation signal 205, the operation signal 205 may be asynchronous with the first synchronization signal 204 (and also asynchronous with the source output enabling signal 206). Here, the synchronization enabling signal 203 is at the second voltage level (such as the low voltage level), and the touch driver 220 controls the touch panel 240 not to follow the first synchronization signal 204 to perform touch sensing. At this time, during the touch sensing period of the touch panel 240, the touch driver 220 may follow an original setting value, or increase a frequency of the touch sensing period, without being affected by the screen idling period of the first synchronization signal 204. For example, during the touch sensing period of the touch panel 240, the touch panel 240 may sense when the first synchronization signal 204 is at a high voltage, or may also sense when the first synchronization signal 204 is at a low voltage. In this way, the touch driver 220 may increase the sensing frequency of the touch panel 240 to effectively ensure that a writing result of the user on the touch panel 240 through the stylus 250 may be sensitively sensed without the occurrence of discontinuous or unclear writing tracks.

Figure 5:
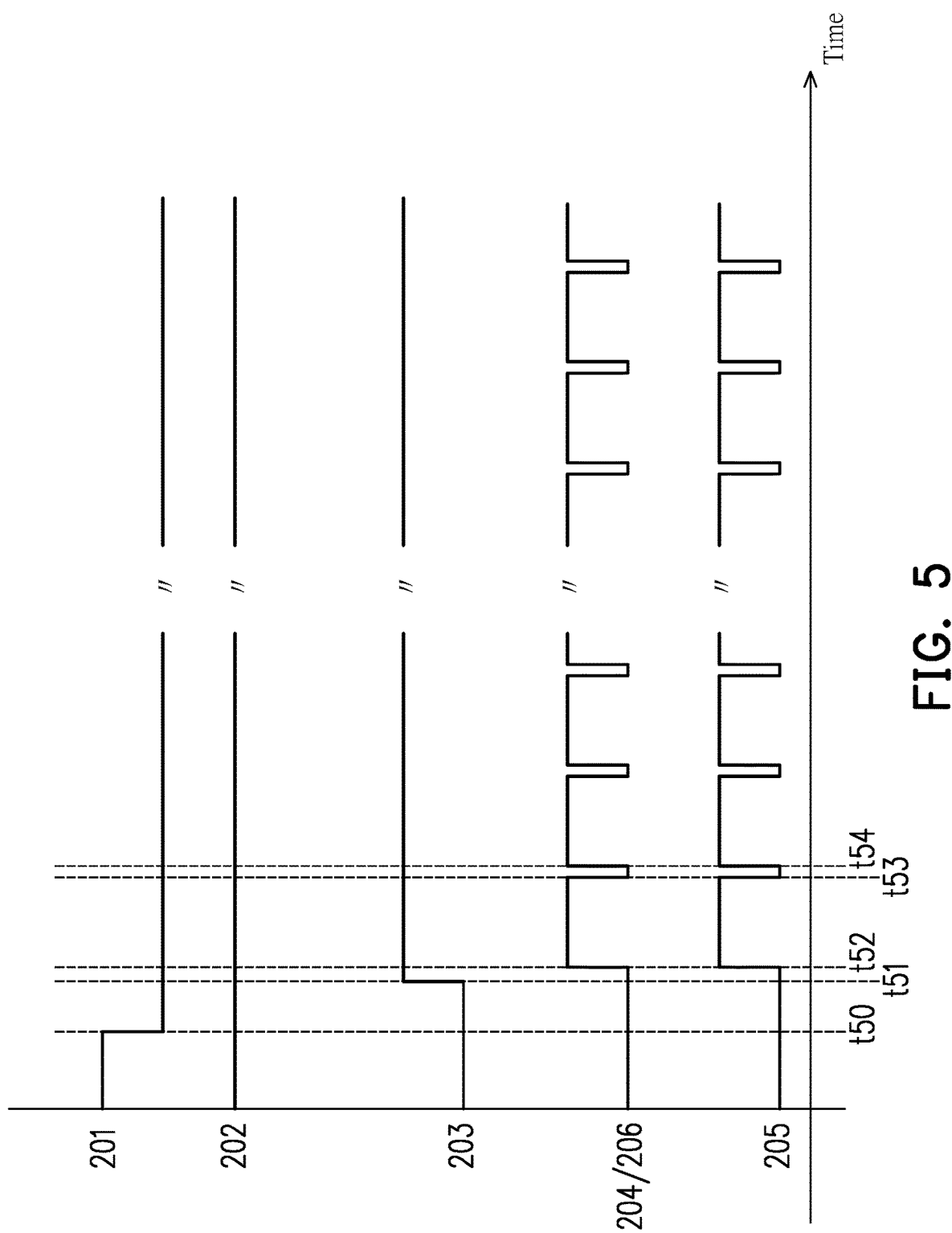
FIG. 5 is a timing diagram of a general operation of a stylus according to an embodiment of the disclosure.

FIG. 5 is a timing diagram of the general operation of the stylus according to an embodiment of the disclosure. Referring to FIG. 2 and FIG. 5, FIG. 5 takes the general operation of the stylus 250 operating on the touch panel 240 as an example. The general operation of the stylus 250 may refer to simple touch operations performed by the user through the stylus 250, such as turning pages or clicking. In this embodiment, the user may use the stylus 250 to perform the general operation on the touch panel 240 of the touch display device 200. At a time t50, when the touch driver 220 senses that the stylus 250 touches the touch panel 240 to perform touch, the touch driver 220 outputs the touch mode signal 201 having the second voltage level (such as the low voltage level) to the host control circuit 211. At a time t51, the host control circuit 211 may determine to output the writing enabling signal 202 having the third voltage level (such as the high voltage level) to the TCON 212 according to the touch mode signal 201, so that the TCON 212 may output the synchronization enabling signal 203 having the first voltage level (such as the high voltage level) to the touch driver 220 according to the writing enabling signal 202. In this embodiment, the touch driver 220 may determine whether the touch panel 240 follows the first synchronization signal 204 to perform touch sensing according to the synchronization enabling signal 203.

At a time t52, the TCON 212 may output the first synchronization signal 204 to the touch driver 220. In this embodiment, the touch driver 220 may determine to follow the signal frequency of the first synchronization signal 204 (i.e. follow the source output enabling signal 205) to perform touch sensing according to the synchronization enabling signal 203 having the first voltage level. The touch driver 220 may operate the touch panel 250 according to the operation signal 205, in which the operation signal 205 is synchronized with the first synchronization signal 204. In other words, when the TCON 212 determines that the writing enabling signal 202 is at the first voltage level, the sensing period of the touch panel 240 is synchronized with the screen idling period of the display panel 230.

Specifically, referring to the source output enabling signal 206, after the time t52, the source output enabling signal 206 has the waveform that changes periodically. For this, a period of the time t52 to a time t54 is a period of the display panel 230 displaying a frame, and a waveform after the time t54 may be deduced by analogy. During a period of the time t52 to a time t53, the display panel 230 may drive the plurality of pixel units in the panel according to the display data. A period of the time t53 to the time t54 may be the screen idling period, and the TCON 212 may not drive the pixel units in the panel during this period. Next, referring to the operation signal 205, the operation signal 205 may be synchronized with the first synchronization signal 204 (also synchronized with the source output enabling signal 206). The touch driver 220 may determine that the sensing period is the period of the time t53 to the time t54 according to the operation signal 205, so that the sensing period of the touch panel 240 is synchronized with the screen idling period of the display panel 230. For example, the touch driver 220 may operate the touch panel 240 to perform touch sensing during the period of the time t53 to the time t54, and not to perform touch sensing during the period of the time t52 to the time t53. Therefore, the touch sensing result obtained by the touch driver 220 for the general operation performed by the user through the stylus 250 is not subject to the electromagnetic interferences generated by the display driving of the display panel 230, and the correct touch sensing result may be provided.

Figure 6:
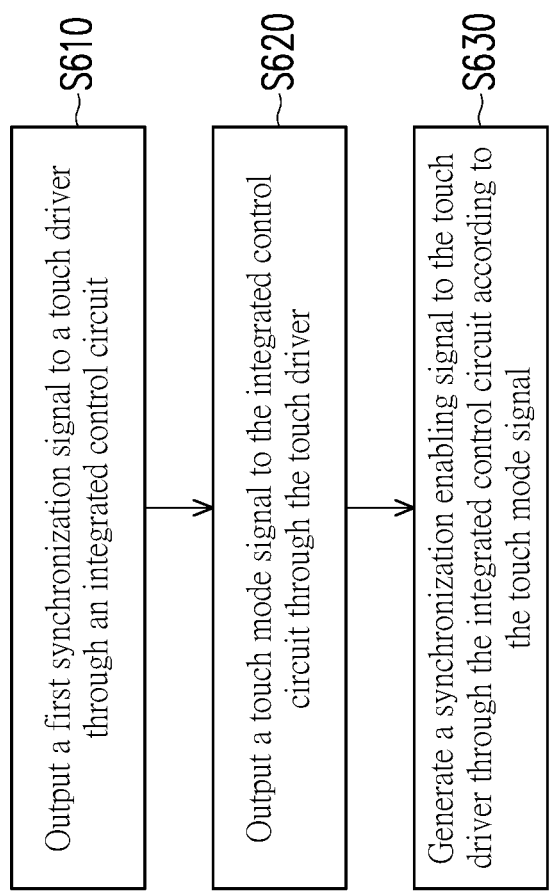
FIG. 6 is a flowchart of an operation method of a touch display device according to an embodiment of the disclosure.

FIG. 6 is a flowchart of an operation method of a touch display device according to an embodiment of the disclosure. The operation method of the touch display device of this embodiment may be applied to the touch display devices 100 and 200 shown in FIG. 1 and FIG. 2. Taking FIG. 1 as an example, referring to FIG. 1 and FIG. 6, the touch display device 100 may execute the following Step S610 to S630 to realize an effective touch sensing function. In Step S610, the touch display device 100 outputs the first synchronization signal 104 to the touch driver 120 through the integrated control circuit 110. In Step S620, the touch display device 100 outputs the touch mode signal 101 to the integrated control circuit 110 through the touch driver 120. In Step S630, the touch display device 100 generates the synchronization enabling signal 103 to the touch driver 120 through the integrated control circuit 110 according to the touch mode signal 101. Therefore, the touch driver 130 may effectively drive the touch panel according to the synchronization enabling signal 103 and the first synchronization signal 104.

In addition, for the specific method of driving the touch panel and the technical effect of the touch driver 120 in this embodiment, reference may be made to the descriptions of the above embodiments in FIG. 1 to FIG. 5, and details will not be repeated here.

In summary, the touch display device and the operation method thereof of the disclosure may correspondingly determine the touch sensing period of the touch panel according to the touch result of fingers of the user currently sensed or the touch result of the stylus sensed of the touch driver through the touch panel. When the touch driver is currently used to sense the touch result of fingers of the user through the touch panel, the touch driver may use a low frequency touch sensing method that is synchronized with the screen idling period of the display panel to effectively reduce or avoid the touch sensing result being affected by the electromagnetic interferences generated by the display panel during the display driving process. Moreover, when the touch driver is currently used to sense the touch result of the stylus through the touch panel, the touch driver may use a high frequency touch sensing method to effectively ensure that the writing result of the user by the stylus on the touch panel may be sensitively sensed without the occurrence of discontinuous or unclear writing tracks to reduce or avoid the touch sensing result being affected by the electromagnetic interferences generated by the display panel during the display driving process.

Although the disclosure has been disclosed above with the embodiments, the embodiments are not intended to limit the disclosure. Persons with ordinary knowledge in the technical field may make some changes and modifications without departing from the spirit and scope of the disclosure. The scope of protection of the disclosure should be defined by the appended claims.

What is claimed is:

1. A touch display device, comprising:
   an integrated control circuit; and
   a touch driver, coupled to the integrated control circuit;
   wherein the integrated control circuit outputs a first synchronization signal to the touch driver, and the touch driver outputs a touch mode signal to the integrated control circuit, so that the integrated control circuit generates a synchronization enabling signal to the touch driver according to the touch mode signal.

2. The touch display device according to claim 1, wherein the integrated control circuit outputs a source output enabling signal to a display panel, and the first synchronization signal is synchronized with the source output enabling signal.

3. The touch display device according to claim 1, wherein the touch driver is coupled to a touch panel, wherein the touch driver controls whether the touch panel follows the first synchronization signal to perform touch sensing according to the synchronization enabling signal.

4. The touch display device according to claim 3, wherein the synchronization enabling signal is at a first voltage level, and the touch panel follows the first synchronization signal to perform touch sensing.

5. The touch display device according to claim 4, wherein the touch driver determines that a sensing period of the touch panel is synchronized with a screen idling period of the display panel updating a screen according to the first synchronization signal.

6. The touch display device according to claim 5, wherein the synchronization enabling signal is at a second voltage level, the touch panel does not follow the first synchronization signal to perform touch sensing, and the sensing period of the touch panel is not synchronized with the screen idling period of the display panel.

7. The touch display device according to claim 4, wherein when a stylus performs a general operation, the synchronization enabling signal is at the first voltage level.

8. The touch display device according to claim 1, wherein the integrated control circuit comprises:
   a host control circuit, coupled to the touch driver; and
   a timing controller (TCON), coupled to the host control circuit and the display panel, and outputting the first synchronization signal to the touch driver and the display panel;
   wherein the host control circuit generates a writing enabling signal to the TCON according to the touch mode signal, the TCON generates the first synchronization signal according to the writing enabling signal, and the host control circuit or the TCON outputs the synchronization enabling signal to the touch driver.

9. The touch display device according to claim 8, wherein when the host control circuit determines that the writing enabling signal is at a third voltage level, the host control circuit outputs the synchronization enabling signal having a first voltage level.

10. An operation method of a touch display device, comprising:
- outputting a first synchronization signal to a touch driver and a display panel through an integrated control circuit;
- outputting a touch mode signal to the integrated control circuit through the touch driver; and
- generating a synchronization enabling signal to the touch driver through the integrated control circuit according to the touch mode signal.

11. The operation method according to claim 10, wherein the first synchronization signal is synchronized with a source output enabling signal.

12. The operation method according to claim 10, wherein the touch driver is further coupled to a touch panel, and the operation method further comprises:
- whether the touch panel follows the first synchronization signal to perform touch sensing is controlled by the touch driver according to the synchronization enabling signal.

13. The operation method according to claim 12, wherein the synchronization enabling signal is at a first voltage level, and the touch panel follows the first synchronization signal to perform touch sensing.

14. The operation method according to claim 13, wherein the step of controlling whether the touch panel follows the first synchronization signal to perform touch sensing comprises:
- determining that a sensing period of the touch panel is synchronized with a screen idling period of the display panel updating a screen through the touch driver according to the first synchronization signal.

15. The operation method according to claim 14, wherein the synchronization enabling signal is at a second voltage level, the touch panel does not follow the first synchronization signal to perform touch sensing, and the sensing period of the touch panel is not synchronized with the screen idling period of the display panel.

16. The operation method according to claim 13, wherein when a stylus performs a general operation, the synchronization enabling signal is at the first voltage level.

17. The operation method according to claim 10, wherein the integrated control circuit comprises a host control circuit and a TCON, wherein generating the synchronization enabling signal to the touch driver comprises:
- outputting the first synchronization signal to the touch driver and the display panel through the TCON;
- generating a writing enabling signal to the TCON according to the touch mode signal through the host control circuit;
- generating the first synchronization signal according to the writing enabling signal through the TCON; and
- outputting the synchronization enabling signal to the touch driver through the host control circuit or the TCON.

18. The operation method according to claim 17, wherein generating the synchronization enabling signal to the touch driver further comprises:
- when the host control circuit determines that the writing enabling signal is at a third voltage level, the synchronization enabling signal having a first voltage level is output through the host control circuit.

* * * * *